(12) United States Patent
Norman et al.

(10) Patent No.: US 7,178,807 B2
(45) Date of Patent: Feb. 20, 2007

(54) SHAFT MOUNTED SEAL DEVICE AND METHOD FOR A SCRAPED SURFACE HEAT EXCHANGER

(75) Inventors: Drew Van Norman, Whitewater, WI (US); Benjamin Hardy, Elkorn, WI (US); Curt Hagen, Delavan, WI (US)

(73) Assignee: SPX Corporation, Charlotte, NC (US)

( * ) Notice: Subject to any disclaimer, the term of this patent is extended or adjusted under 35 U.S.C. 154(b) by 212 days.

(21) Appl. No.: 10/866,819

(22) Filed: Jun. 15, 2004

(65) Prior Publication Data

US 2005/0285347 A1 Dec. 29, 2005

(51) Int. Cl.
F16J 15/34 (2006.01)

(52) U.S. Cl. ........................ 277/399; 277/377

(58) Field of Classification Search ............... 277/399, 277/377, 370, 358; 65/94

See application file for complete search history.

(56) References Cited

U.S. PATENT DOCUMENTS

| | | | | | |
|---|---|---|---|---|---|
| 3,633,664 | A | * | 1/1972 | Walsh et al. | 165/94 |
| 4,022,479 | A | * | 5/1977 | Orlowski | 277/347 |
| 4,282,925 | A | * | 8/1981 | Hay et al. | 165/94 |
| 4,535,836 | A | * | 8/1985 | Thomas et al. | 165/86 |
| 5,158,304 | A | * | 10/1992 | Orlowski | 277/421 |
| 6,994,351 | B2 | * | 2/2006 | Van Norman | 277/372 |

* cited by examiner

Primary Examiner—William L. Miller
(74) Attorney, Agent, or Firm—Baker & Hostetler LLP

(57) ABSTRACT

A scraped surface heat exchanger includes a seal assembly between a rotating tube and the end housing. The seal assembly is removable by removing the tube.

8 Claims, 9 Drawing Sheets

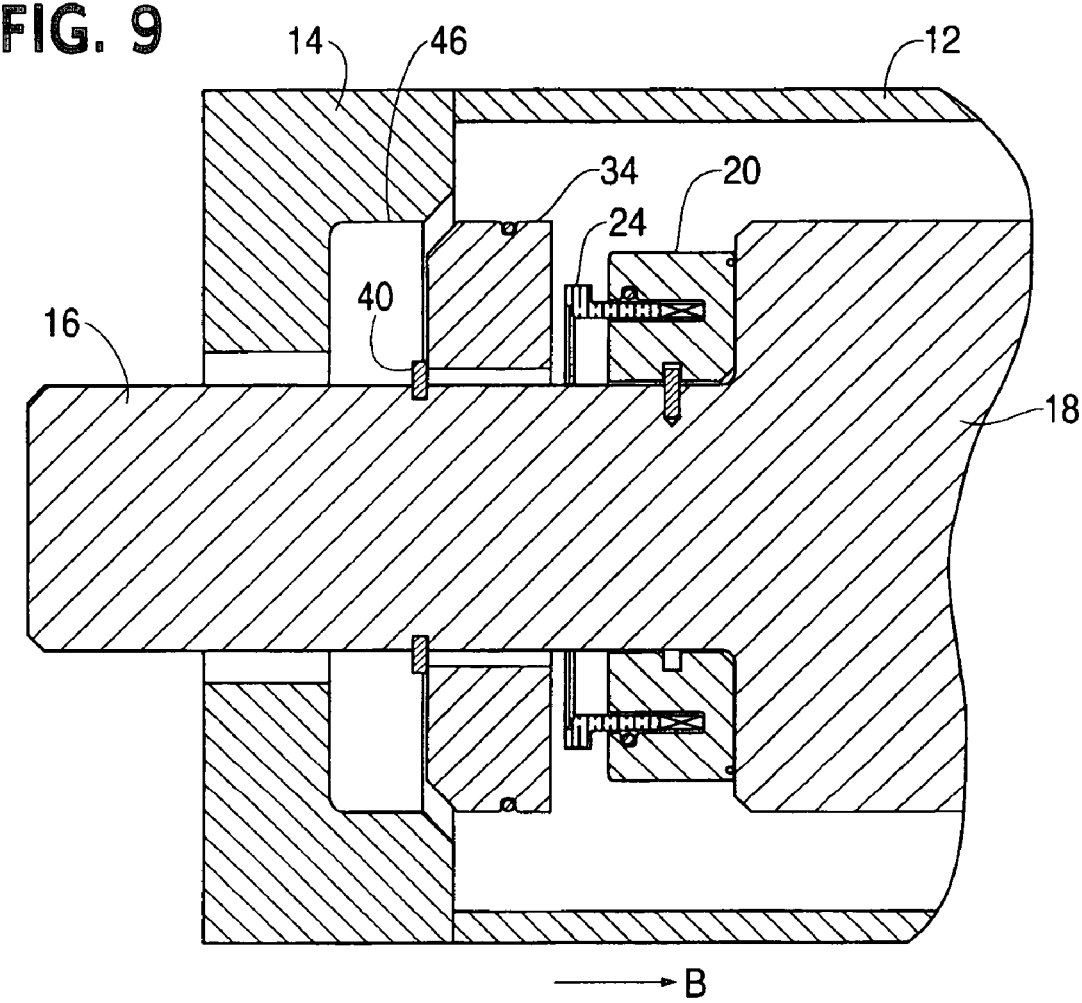

SHAFT MOUNTED SEAL DEVICE AND METHOD FOR A SCRAPED SURFACE HEAT EXCHANGER

FIELD OF THE INVENTION

The invention pertains generally to sealing devices and methods for sealing a rotating member against a fixed non-rotating housing. More particularly, the invention relates to a sealing device and method for use in a scraped surface heat exchanger having a central rotating shaft and a fixed non-rotating outer housing and end caps.

BACKGROUND OF THE INVENTION

Many materials handling industries, and particularly the food processing industry, often use a device referred to as a scraped surface heat exchanger. A scraped surface heat exchanger generally features a tubular outer housing which surrounds a rotating central shaft. The rotating central shaft has hingedly connected paddles or blades that extend angularly radially outward and contact the inside surface of the outer housing as the central shaft rotates. The outer housing has a material inlet at one end and a material outlet at the other end and the material being processed is pumped through so that it passes along the length of the heat exchanger from the inlet to the outlet.

The outer housing is typically heated or cooled so that the material will undergo a change of temperature as it passes through the scraped surface heat exchanger. Further, the paddles or blades help agitate the material and/or scrape it off the inside surface of the heat exchanger as desired.

Since the scraped surface heat exchanger essentially has a single longitudinal rotating central shaft that rotates within a fixed longitudinal cylindrical housing, it is typical to suspend the shaft at each end of the housing via a roller or ball bearing arrangement at the end caps of the housing at each end of the shaft and each respective end of the housing. It is typically desirable to provide a seal so that the material does not come into contact with these roller bearings. Providing such a seal between the shaft and the housing is desirable to isolate the bearings from the material so that the bearings do not become clogged, to permit lubrication of the bearings, and/or to permit cleaning of the bearings by separating the bearings from the material. Further, preventing the food product from contacting the bearings also enhances the cleanliness of the food product so that it is not contaminated by materials associated with the bearings.

The known sealing arrangements for sealing between the inside of the housing from the rotating central tube have some disadvantages, however, in particular, due to cleanliness restrictions and regulations that are particularly imposed when the scraped surface heat exchanger is used for food-based applications, sanitary requirements often require that the shaft be removed and all the sealed components cleaned with substantial frequency in some cases even daily.

Scraped surface heat exchangers are generally fairly long tubes, for example 3–6 feet long, and to save the floor space each one occupies in a facility, they are often vertically mounted. The disassembly of most known seals for the removal of the shaft and seal components for cleaning, generally requires that both the end caps of the heat exchanger be removed. For vertically mounted units, this requires an operator to reach up, or in some cases climb up, to the height of the top of the scraped surface heat exchanger each time such a disassembly and cleaning process is to be performed. This can be cumbersome and time consuming, and also increases the risk that the operator will drop one of the loose parts from top of the heat exchanger during disassembly.

Accordingly, it would be desirable to have a seal assembly and method for a scraped surface heat exchanger wherein removal of the central tube and the cleanable seal components for both ends of the unit can be accomplished from only one end of the heat exchanger, which could be the lower end in vertically installed units.

SUMMARY OF THE INVENTION

The present invention provides an apparatus and method for sealing the end of a scraped surface heat exchanger. Further, in some aspects, the invention provides embodiments where the central tube and the seal bearings for both ends of the heat exchanger can be removed by an operation carried out at only one end of the heat exchanger.

In accordance with one embodiment of the present invention, an apparatus for sealing a rotatable central shaft to an end of a scraped surface heat exchanger, comprises a first seal component mounted to the shaft at a first location on the shaft for rotation with the shaft, a second seal component located at a second location longitudinally outwardly from the first seal component and disposed about the shaft, a lock feature mounted to the shaft and disposed at a third location outward from the second seal component, and a receiving counter bore in the end of the scraped surface heat exchanger for receiving the second seal component and supporting the second seal component against rotation when the shaft rotates.

In accordance with another embodiment of the present invention an apparatus for sealing a rotatable central shaft to an end of a scraped surface heat exchanger, comprises a first sealing means mounted to the shaft at a first location on the shaft for rotation with the shaft, a second sealing means located at a second location longitudinally outwardly from the first sealing means and disposed about the shaft, locking means mounted to the shaft and disposed at a third location outward from the second sealing means, and a receiving means in the end of the scraped surface heat exchanger for receiving the second sealing means and supporting the second sealing means against rotation when the shaft rotates.

In accordance with yet another embodiment of the present invention, a method of installing a seal on a scraped surface heat exchanger having a rotatable shaft, and an end cap, comprises urging a first seal component located at a first location on the shaft in a direction towards the end cap, urging a second seal component located at a second location on the shaft outward of the first location into a receiving counter bore in the end cap so that the second seal component is frictionally maintained in the end cap, and positioning the first and second seal components so they make sealing contact when the shaft rotates relative to the end cap.

A method of removing a seal from a scraped surface heat exchanger having a rotating shaft, and an end cap, comprising urging a first seal component located on the shaft at a first location in a direction away from the end cap, removing a second seal component located at a second location on the shaft outward of the first location from a receiving counter bore in the end cap so that the second seal member is removed from the end cap, and removing a shaft end from a bore in the end cap of the scraped surface heat exchanger.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 9 is a view similar to FIG. 1, showing the device moving into a fully disassembled state.

DETAILED DESCRIPTION

Figure 1:
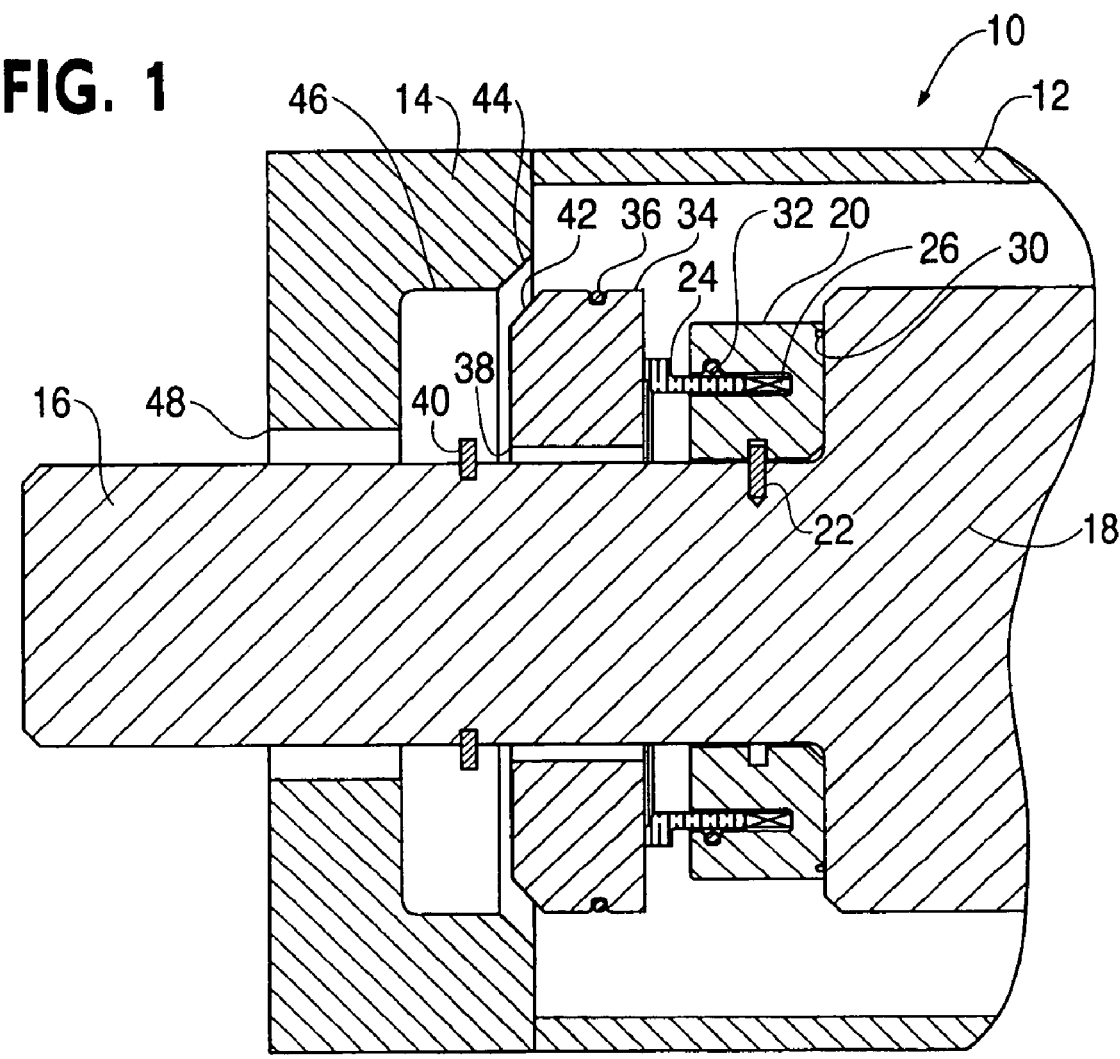
FIG. 1 is a detailed cross sectional view of one end of the scraped surface heat exchanger according to a preferred embodiment of the present invention, showing a first step for assembly.

The present invention provides an apparatus and method for sealing one or both ends of a scraped surface heat exchanger. Further, in some aspects, the invention provides embodiments where the central tube and the seal bearings for both ends of the heat exchanger can be removed by an operation carried out at only one end of the heat exchanger. Preferred embodiments of the invention will now be described with reference to the drawing figures, in which like reference numerals illustrate like parts throughout.

Turning to FIG. 1, an end of a scraped surface heat exchanger according to the preferred embodiment is illustrated. The scraped surface heat exchanger 10 includes a schematically illustrated tube wall 12 which is mechanically joined to a head or end cap component 14. The tube 12 is typically nickled with chrome plating or stainless steel and the end cap 14 is typically stainless steel. The end cap 14 can be removably attached to the tube 12. A similar end cap 14 is typically present on each end of the tube 12. At least one of the ends 14, in this case, the end opposite to the end shown, will have the head 14 removably attached by bolts and flanges or similar means. By virtue of some embodiments the invention, as will be seen below the end 14 illustrated does not need to be removable, but in some instances will be made removable if appropriate.

A bearing arrangement (not shown) supports the stub end 16 of the central shaft 18 of the heat exchanger. Each end cap 14 includes an appropriate bearing arrangement which supports the shaft stub 16 rotatably to extend out of the end 14. One end 14 will also have a drive motor which is connected to drive the shaft 18 and its end 16.

Where the stub 16 meets the larger diameter shaft portion of the shaft 18, a seal retainer 20 is fit onto the stub 16 as shown. A pin 22 can be used to removably retain the seal retainer 20 in the position shown. The seal retainer 20 supports an L shaped cross section sealing ring 24 which is biased away from the seal retainer by a spring 26 as shown. The seal retainer 20 will typically be made of stainless steel and the L-shaped sealing ring 24 is typically made of an engineered ceramic, such as tangster carbide, silicon carbide, alumina on carbon. The spring 26 is preferably a wave spring, a plurality of radially spaced coil springs, or a single layer oil spring.

An O-ring 30 and an O-ring 32 are provided to provide some sealing of the seal retainer 20 so that material does not seep into the gap between the seal retainer 20 and the shaft 18. The sealing ring 24 generally rotates with the shaft 18 when the shaft 18 rotates and is in a sliding/rotating frictional contact with a stationary sealed seat 34. The stationary seal seat 34 is typically made of tungsten carbide, silicon carbide, a ceramic, or alumina. The stationary sealed seat 34 has an O-ring 36. The stationary seal seat 34 has an inner bore 38 which is dimensioned to have a free clearance around the stub 16. The stub 16 also has a locking ring 40 mounted into a groove around the stub 16. The function of the locking ring 40 will be described in more detail below. Also, the seal set 34 has a bevel portion 42 which is dimensioned at an angle generally similar to a beveled countersink 44 in the end cap 14. The end cap 14 also has a receiving cup 46 provided by a counter bore surrounding a bore 48 in the end cap 14, which provides a clearance around the stub 16 allowing it to rotate. A corner 46a is located where the bevel 44 meets the cap 46.

FIG. 1 illustrates these components in a horizontal orientation as they would be in the beginning of the installation process of a horizontally arranged scraped surface heat exchanger. However, the assembly can also be used in a vertically-oriented scraped heat exchanger, and for example if rotated 90 degrees clockwise, FIG. 1 would represent a starting position for installing the assembly in the top end of a scraped surface heat exchanger. At the initial phase shown in FIG. 1, the stub end 16 has been piloted through the bore 38 in the end cap 14 and the stationary valve seat 34 is generally restrained by the locking ring 40 on one side and the spring biased seal 24 to the other side. The seal retainer 20 has already been attached with the pin 22 onto the stub 16. The seal retainer 20 can have an L-shape keyway so that the seal retainer 20 can be slid over the pin 22 and locked on the stub 16 by rotating the seal retainer 20.

Figure 2:
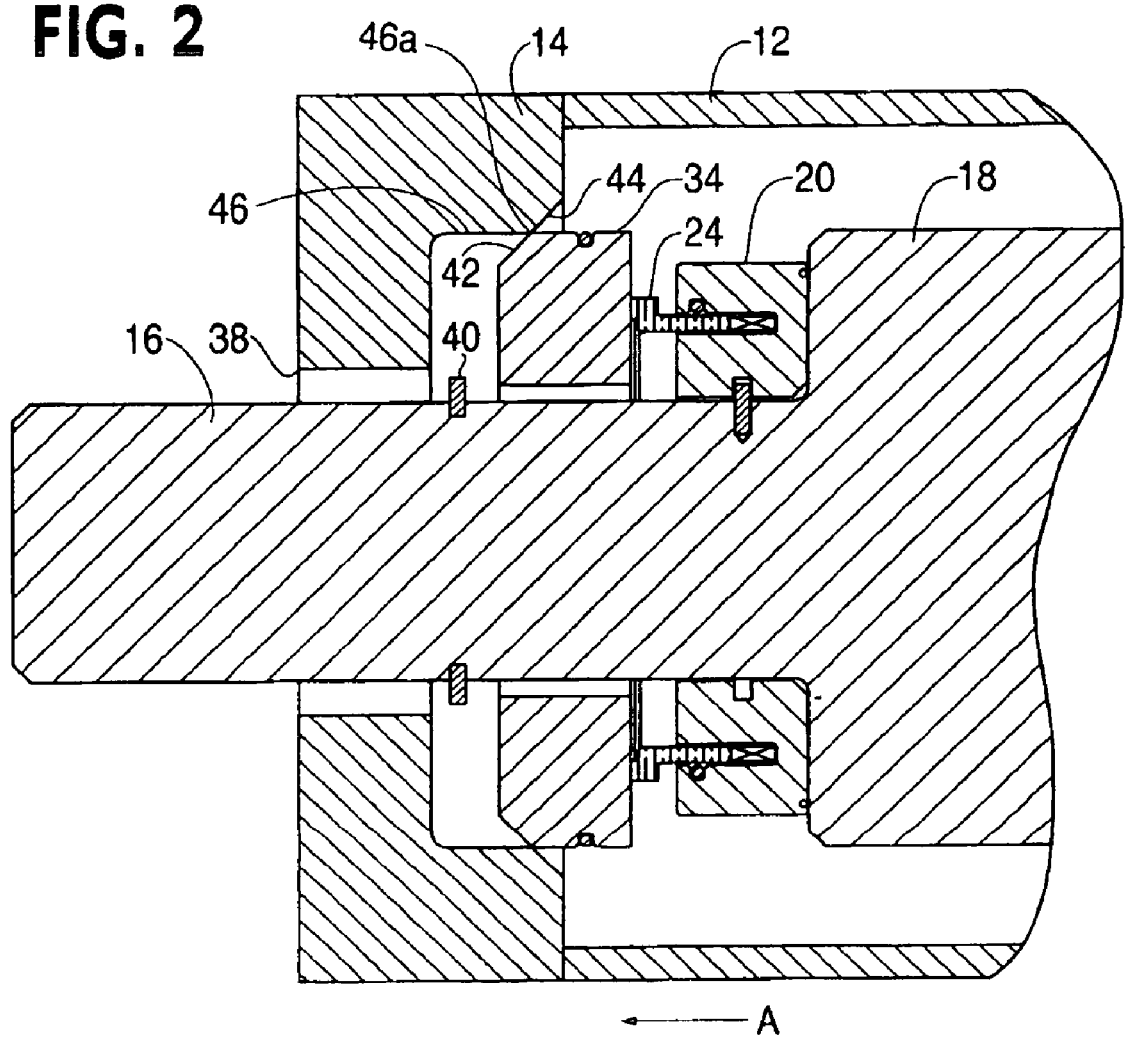
FIG. 2 is a view similar to FIG. 1, showing the device of FIG. 1 in a second step for assembly.
Figure 3:
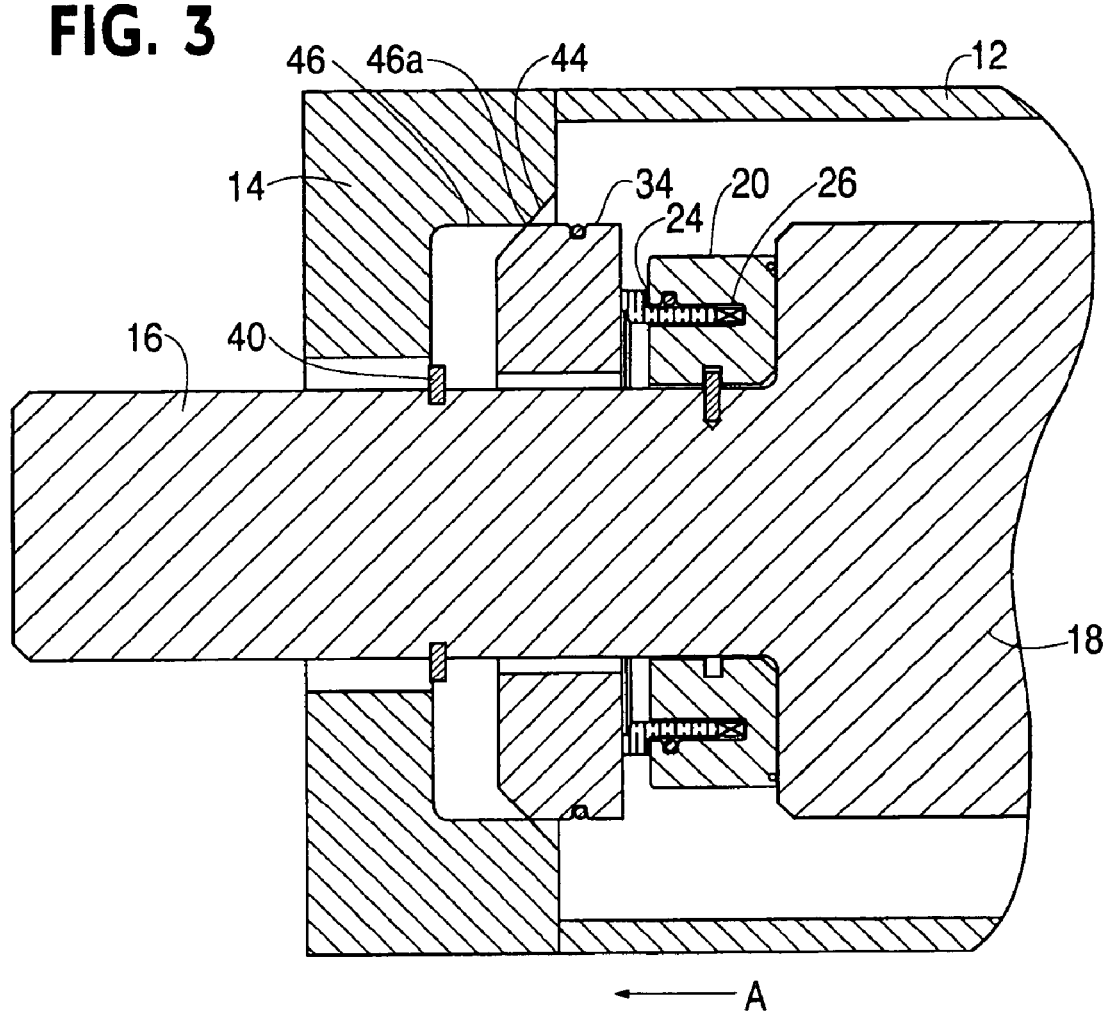
FIG. 3 is a view similar to FIG. 1, showing the device in a third step for assembly.

Turning to FIG. 2, the entire shaft 18 is being urged in the direction shown by the arrow A by a force being applied at the other end of the shaft 18 so that the seal seat 34 is being urged in to contact with the side wall 46a of the receiving cap 46 of the head end 14. The beveled surfaces 44 and 42 serve to guide and center the seat 34 into the receiving cap 46. FIG. 3 illustrates the result of further pressing in the direction A. The force causes the spring 26 to compress so that the seal 24 contacts both the retainer 20 and the seat 34, and all force transmitted in the direction A will be applied to move the seat 34 in the same direction into the receiving portion 46. Note that the L shape of the sealing ring, 24 provides a direct load path between the shaft 18, seal retainer 20, L shaped leg of the sealing ring 24, and the seat 34. Thus, the spring 26 does not need to be over-compressed.

Figure 4:
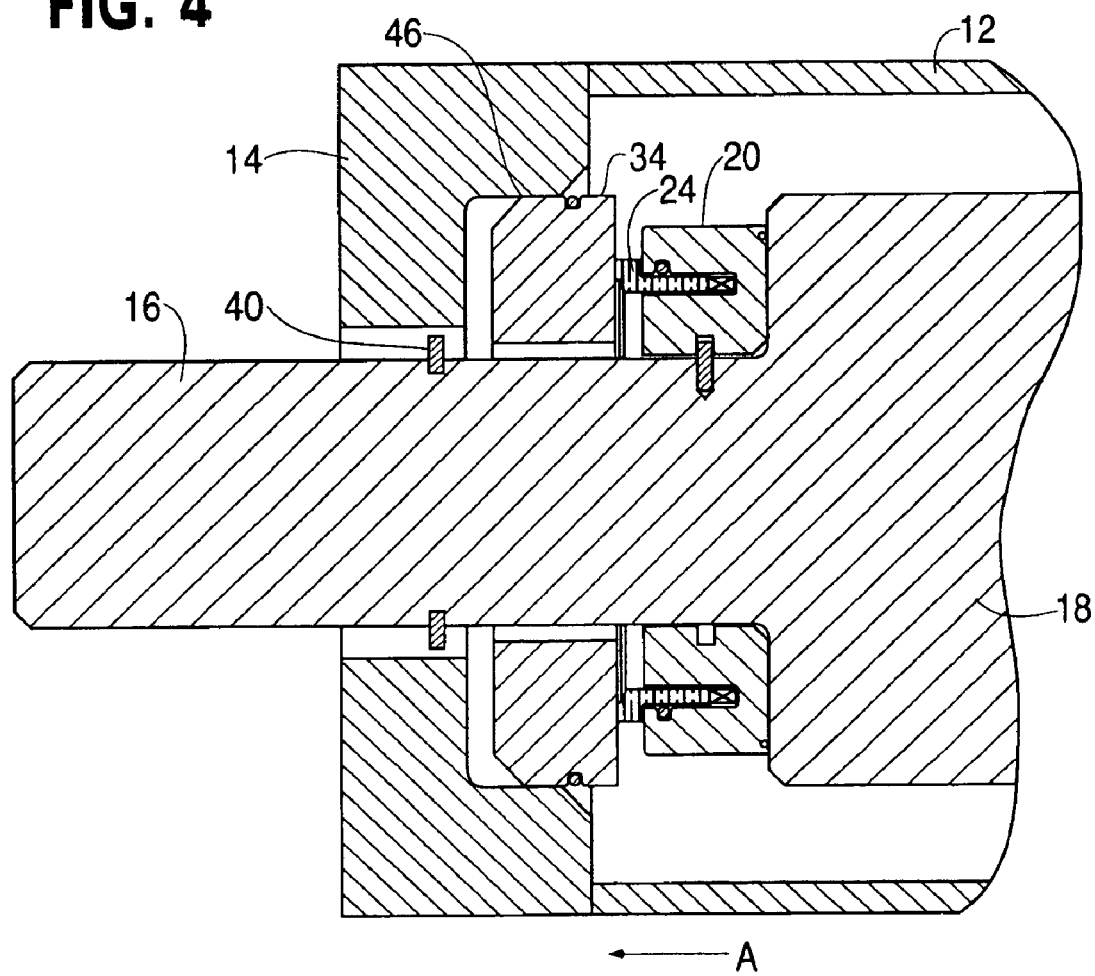
FIG. 4 is a view similar to FIG. 1, showing the device in a fourth step for assembly.
Figure 5:
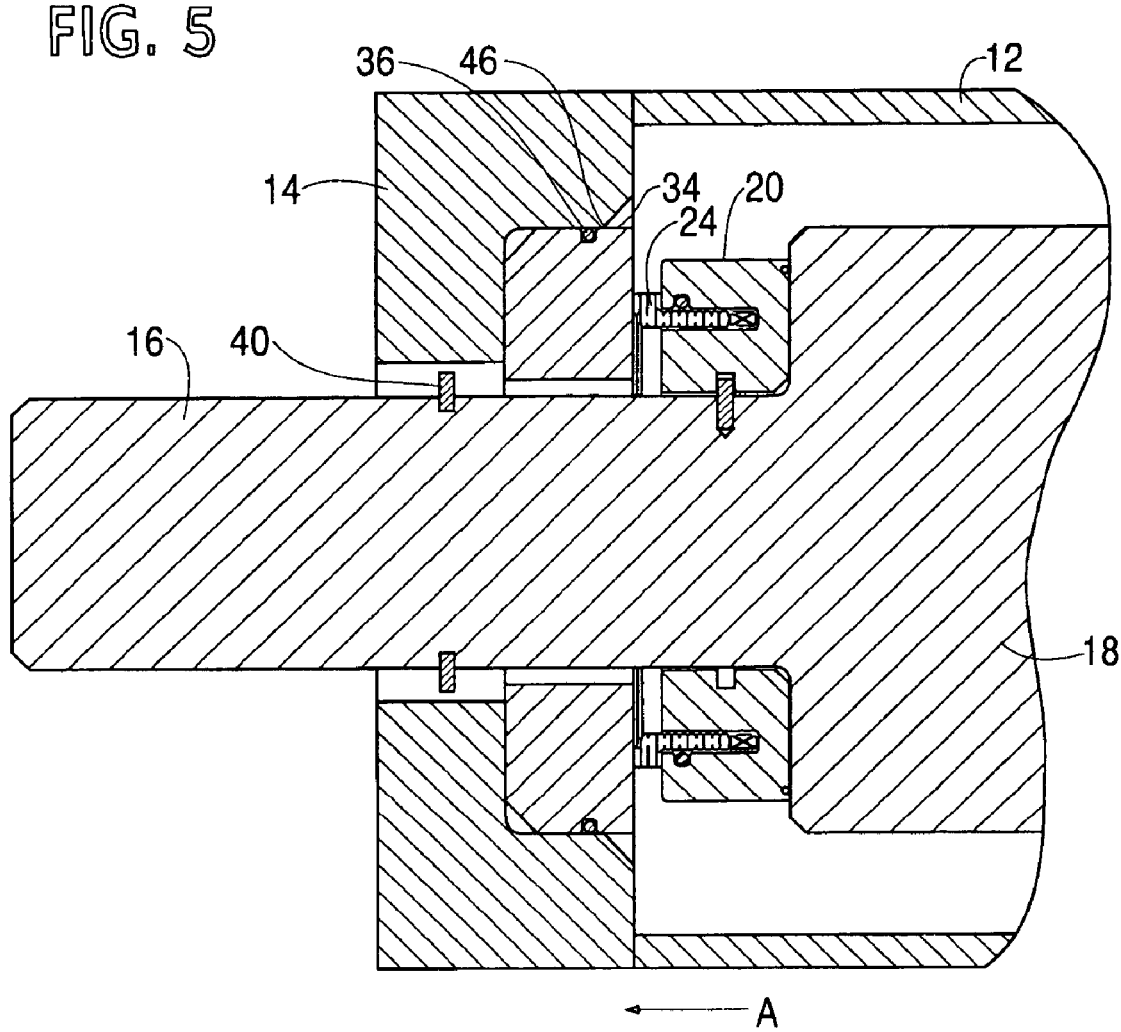
FIG. 5 is a view similar to FIG. 1, showing the device in a fifth step for assembly.

FIG. 4 illustrates the result of a further application of force, when the sliding force between the seat 34 and the receiving area 46 is overcome and the seat 34 becomes fully located as shown in FIG. 5. At this point, the shaft 18 is moved in the direction shown by the arrow B, to the operational position of the scraped surface heat exchanger. The now seated seal seat 34 stays in a non-rotating position sealed by the O-ring 36, and the spring 26 is uncompressed by a small amount and provides a force on the sealing ring 24 to maintain a seal even when the shaft 18 is rotating. The assembly is now in an operational position. It will be appreciated that in the configuration shown in FIG. 6, the material in the volume between the central shaft 18 and the outer housing 12 cannot escape by passing through the rotational seal occurring between the sealing ring 24 and the seat 34, or by passing through the O-ring 36, 32 or 30. The O-rings are typically an elastomer such as a flouroelastomer with a relatively long sealing life.

Figure 6:
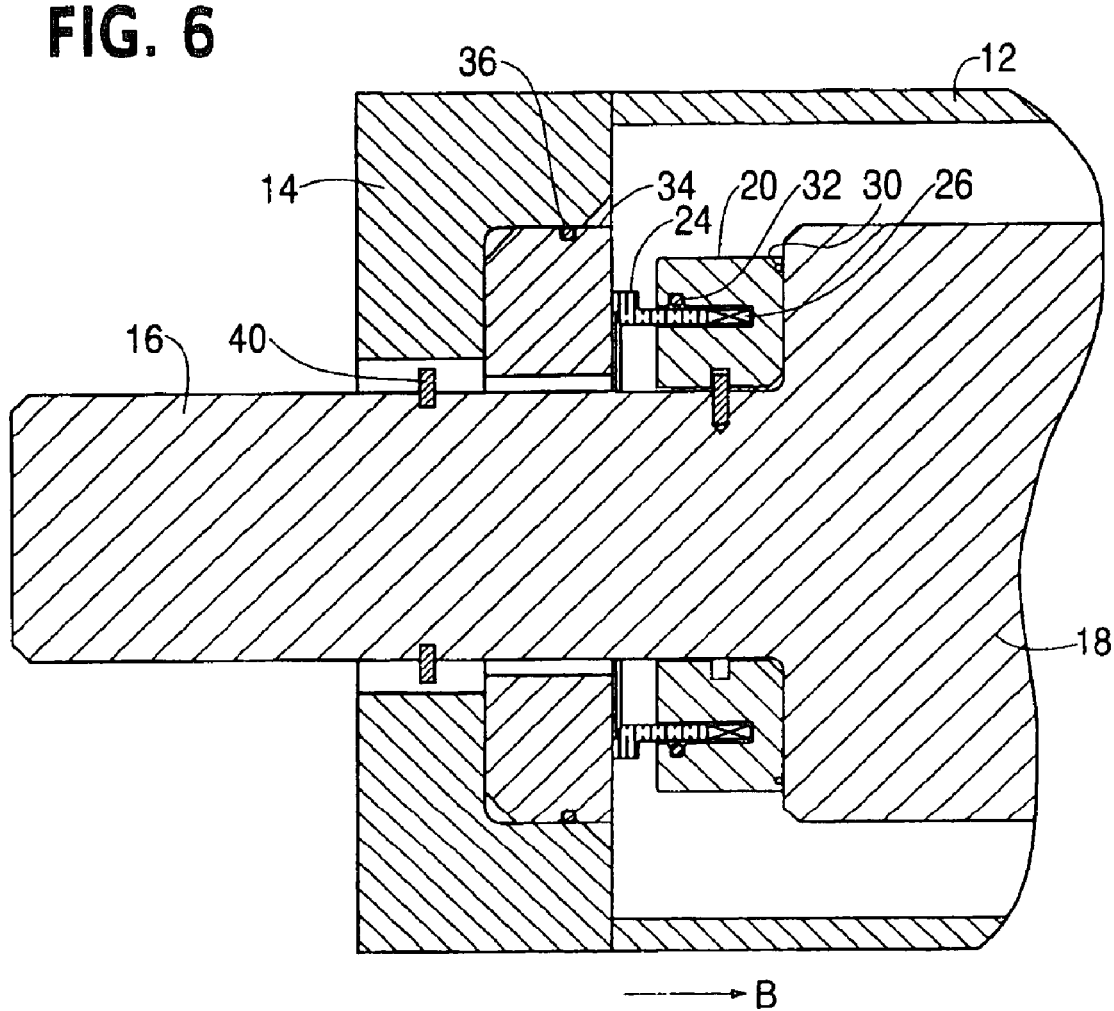
FIG. 6 is a view similar to FIG. 1, showing the device in an operational assembled configuration.

With further reference to FIG. 6, it can be observed that although in FIG. 6 a seat 36 is shown as a stationary member and a seal retainer 20 with a seal 24 are shown as rotating members, these components could be reversed. In such an embodiment the seal retainer is actually the component urged into the a receiver in the head 14, and becomes non-rotating, and so that a seal seat can be mounted to rotate with the shaft.

Figure 7:
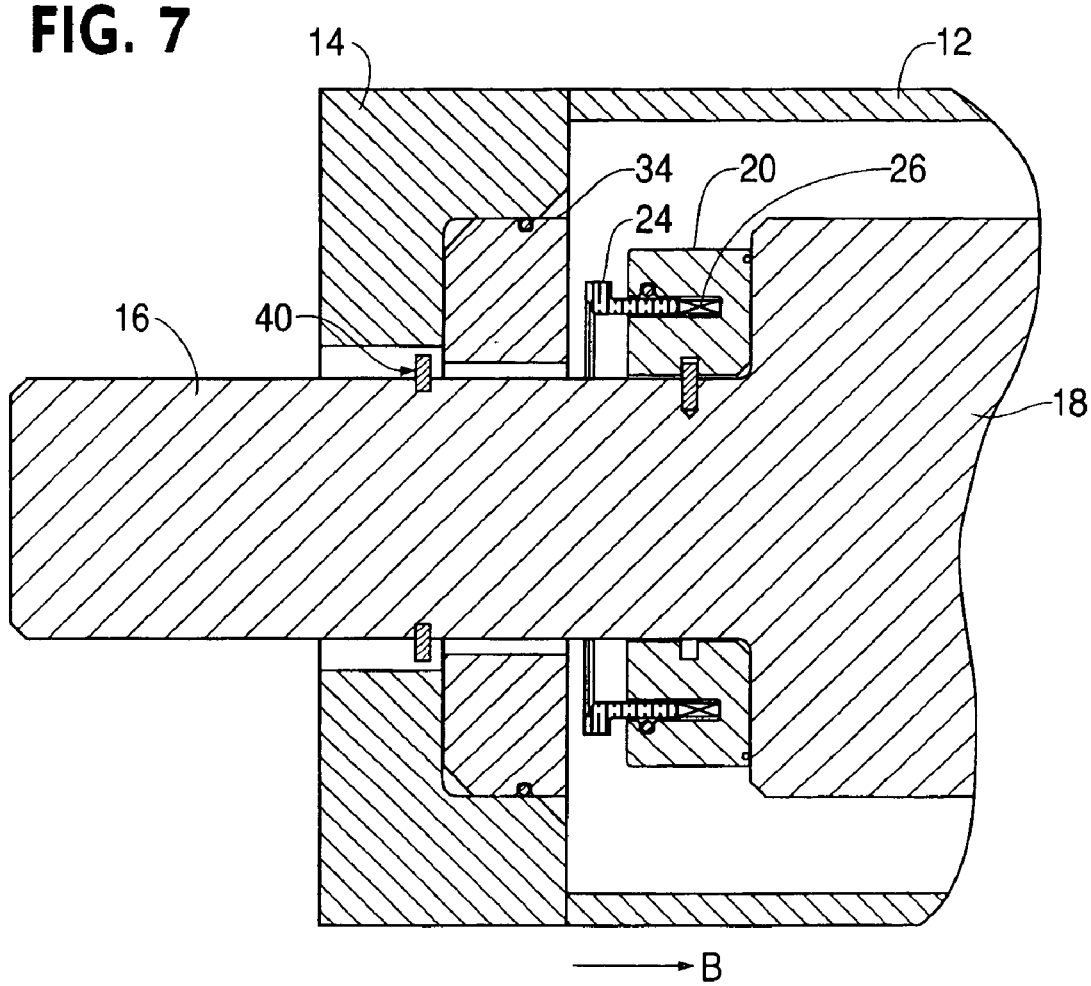
FIG. 7 is a view similar to FIG. 1, showing the device in a first step for disassembly.

FIG. 7 shows the first step in a disassembly process. The shaft is being moved in the direction B, from force applied to the shaft 18 at the other end of the heat exchanger, and the spring 26 is at its fully extension and the seal 24 has moved away from the fully seated sealing ring 34. It will be appreciated also in FIG. 7 that the locking ring 40, which heretofore has performed only the function of retaining the seat 34 on the shaft in FIG. 1, is now moving towards the seat 34.

Figure 8:
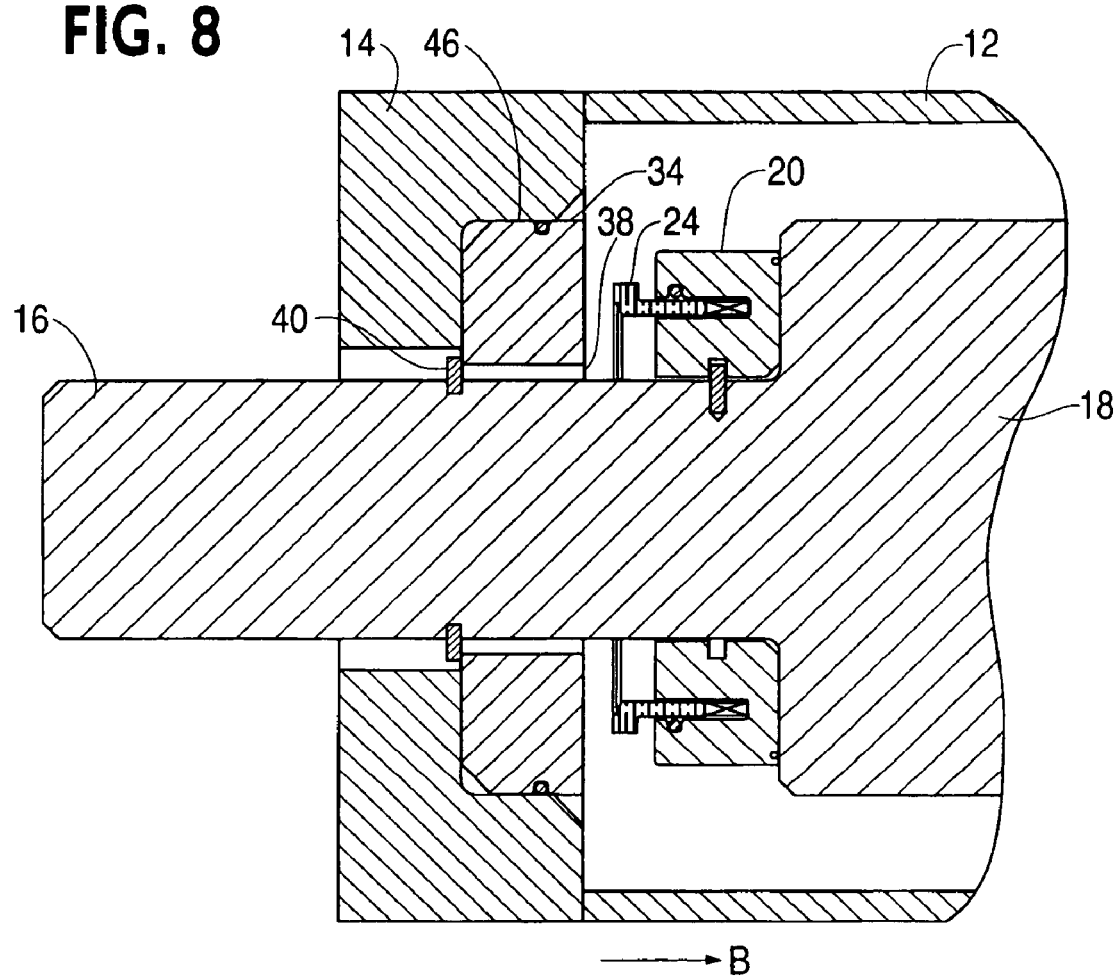
FIG. 8 is a view similar to FIG. 1, showing the device in a meet step for disassembly.

Turning to FIG. 8, the shaft 18 has moved further in the direction shown by arrow B, and the locking ring 40, which has an outer diameter greater than an inner diameter of the bore 38 of the seat 34, now provides a force against the seat 34 in the direction B, so that as shown in FIG. 9, further movement of the shaft in the direction shown by arrow B is sufficient to draw or extract the seat 34 from its receiving cap 46 for complete disassembly. FIG. 9 is similar to FIG. 1, but shows the seat 34 at its position against the lock ring 40, as opposed to against the seal 24. At this stage, it will be appreciated that further movement of the shaft 18 in the direction shown by arrow B will permit withdrawal of the shaft 18 and the seal retainer 20, sealing ring 24 and seal seat 34 from the outer tube housing. The lock ring 40 is typically a C-ring riding in a groove on the stub 16, but a set of removable pins for the like could be used in place of the lock ring.

In view of the above-described operation, the present invention can operate well with scraped surface heat exchangers having a drive end either at the top or the bottom. It will be appreciated that the invention well suited for arrangements where the drive end is at the top, because no removal of parts is required at the top in order to remove the shaft and seal components, and thus disassembling the scraped surface heat exchanger at its bottom end, by removing the bottom end, and pulling the shaft out the bottom, can be accomplished to facilitate cleaning without a need to disassemble parts at the exterior top of the scraped surface heat exchanger.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for sealing a rotatable central shaft to an end of a scraped surface heat exchanger, the apparatus comprising:
   a first seal component mounted to the shaft at a first location on the shaft for rotation with the shaft;
   a second seal component located at a second location longitudinally outwardly from the first seal component and disposed about the shaft;
   a lock feature mounted to the shaft and disposed at a third location outward from the second seal component; and
   a receiving counter bore in the end of the scraped surface heat exchanger for receiving the second seal component and supporting the second seal component against rotation when the shaft rotates, wherein the first seal component has a seal retainer and a spring biased sealing ring and wherein the second seal component is a seal seat.

2. The apparatus of claim 1, wherein the lock feature is a lock ring.

3. The apparatus of claim 1, wherein the second seal component has an outer diameter that frictionally fits inside an inner diameter of the receiving counter bore.

4. An apparatus for sealing a rotatable central shaft to an end of a scraped surface heat exchanger, the apparatus comprising:
   a first seal component mounted to the shaft at a first location on the shaft for rotation with the shaft;
   a second seal component located at a second location longitudinally outwardly from the first seal component and disposed about the shaft;
   a lock feature mounted to the shaft and disposed at a third location outward from the second seal component; and
   a receiving counter bore in the end of the scraped surface heat exchanger for receiving the second seal component and supporting the second seal component against rotation when the shaft rotates, wherein the first seal component comprises a seal retainer mounted to the shaft by at least one pin connection, a groove containing a spring, and a seal ring having an annular L-shaped cross section.

5. An apparatus for sealing a rotatable central shaft to an end of a scraped surface heat exchanger, the apparatus comprising:
   a first sealing means mounted to the shaft at a first location on the shaft for rotation with the shaft;
   a second sealing means located at a second location longitudinally outwardly from the first sealing means and disposed about the shaft;
   locking means mounted to the shaft and disposed at a third location outward from the second sealing means; and a receiving means in the end of the scraped surface heat exchanger for receiving the second sealing means and supporting the second sealing means against rotation when the shaft rotates, wherein the first sealing means has a seal retainer and a spring biased sealing ring and wherein the second sealing means is a seal seat.

6. The apparatus of claim 5, wherein the locking means is a lock ring.

7. The apparatus of claim 5, wherein the second sealing means has an outer diameter that frictionally fits inside an inner diameter of the receiving means.

8. An apparatus for sealing a rotatable central shaft to an end of a scraped surface heat exchanger, the apparatus comprising:
   a first sealing means mounted to the shaft at a first location on the shaft for rotation with the
   a second sealing means located at a second location longitudinally outwardly from the first sealing means and disposed about the shaft;
   locking means mounted to the shaft and disposed at a third location outward from the second sealing means; and
   a receiving means in the end of the scraped surface heat exchanger for receiving the second sealing means and supporting the second sealing means against rotation when the shaft rotates, wherein the first sealing means comprises a seal retainer mounted to the shaft by at least one pin connection, a groove containing a spring, and a seal ring having an annular L-shaped cross section.

* * * * *

UNITED STATES PATENT AND TRADEMARK OFFICE
CERTIFICATE OF CORRECTION

| | | |
|---|---|---|
| PATENT NO. | : 7,178,807 B2 | Page 1 of 1 |
| APPLICATION NO. | : 10/866819 | |
| DATED | : February 20, 2007 | |
| INVENTOR(S) | : Drew Van Norman et al. | |

It is certified that error appears in the above-identified patent and that said Letters Patent is hereby corrected as shown below:

<u>Column 7</u>

Line 16, please insert --shaft;-- after "the" (second occurrence).

Signed and Sealed this

Twenty-fourth Day of April, 2007

JON W. DUDAS
*Director of the United States Patent and Trademark Office*